US012444876B2

(12) United States Patent
Liu

(10) Patent No.: US 12,444,876 B2
(45) Date of Patent: Oct. 14, 2025

(54) ELECTRICAL CONNECTOR FOR USE IN CHRISTMAS TREE

(71) Applicant: Silver Beauty Electronic and Lighting Co., Ltd, HeShan (CN)

(72) Inventor: Huawang Liu, HeShan (CN)

( * ) Notice: Subject to any disclaimer, the term of this patent is extended or adjusted under 35 U.S.C. 154(b) by 433 days.

(21) Appl. No.: 18/298,842

(22) Filed: Apr. 11, 2023

(65) Prior Publication Data

US 2024/0097373 A1 Mar. 21, 2024

(30) Foreign Application Priority Data

Sep. 21, 2022 (CN) ......................... 202222509753.8

(51) Int. Cl.

*H01R 13/514* (2006.01)
*H01R 13/625* (2006.01)
*A47G 33/06* (2006.01)
*H01R 13/44* (2006.01)

(52) U.S. Cl.

CPC ......... *H01R 13/514* (2013.01); *H01R 13/625* (2013.01); *A47G 33/06* (2013.01); *H01R 13/44* (2013.01)

(58) Field of Classification Search

CPC .... H01R 13/514; H01R 13/625; H01R 13/44; H01R 13/512; H01R 2103/00; H01R 24/38; A47G 33/06

See application file for complete search history.

(56) References Cited

U.S. PATENT DOCUMENTS 1,977,136 A * 10/1934 Mallinckrodt .......... F21S 6/001 439/123
2,847,175 A * 8/1958 Farley .................. A47G 33/126 108/150
4,803,396 A * 2/1989 Kelner ................ F21V 19/0005 439/282
5,853,299 A * 12/1998 Wu ........................ H01R 33/22 439/619
6,733,167 B1 * 5/2004 Kao ..................... G02B 6/0006 362/567
7,784,993 B2 * 8/2010 Yu .......................... H05B 45/40 362/652
9,362,657 B1 * 6/2016 Yang ......................... F21S 4/10
9,653,823 B2 * 5/2017 Eriksen ................ H01R 9/0518
12,068,563 B1 * 8/2024 Cai ........................ H01R 35/04

(Continued)

*Primary Examiner* — Truc T Nguyen

(74) *Attorney, Agent, or Firm* — Novoclaims Patent Services LLC; Mei Lin Wong

(57) ABSTRACT

An electrical connector for a Christmas tree includes a first electrical connector body, a second electrical connector body a first outer connector and a second outer connector. The first electrical connector body includes a first electrical connector body which includes an outer securing ring, an inner securing ring provided within the outer securing ring, a annular negative terminal, a annular positive terminal, a negative terminal adapter and a live terminal adapter. The second connector detachably is connected to the first connector, and includes a connecting base, a multiple ring member extending from the connecting base toward the first electrical connector body, a negative terminal, and a positive terminal. The first outer connector is connected to the first connector at a position opposite to the second connector. The second outer connector is connected to the second connector at a position opposite to the first connector.

15 Claims, 8 Drawing Sheets

(56) References Cited

U.S. PATENT DOCUMENTS

| | | | | |
|---|---|---|---|---|
| 2006/0164834 | A1* | 7/2006 | Kao | A47G 33/06<br>362/249.01 |
| 2006/0264105 | A1* | 11/2006 | Lin | H01R 33/09<br>439/619 |
| 2012/0028505 | A1* | 2/2012 | Weber | H01R 35/04<br>439/638 |
| 2013/0301247 | A1* | 11/2013 | Chen | A47G 33/06<br>29/825 |
| 2018/0269641 | A1* | 9/2018 | Ding | H01R 31/02 |
| 2023/0225538 | A1* | 7/2023 | Leung | A47G 33/06<br>439/675 |
| 2024/0027693 | A1* | 1/2024 | Carneiro Lopes | G02B 6/3831 |
| 2024/0097371 | A1* | 3/2024 | Liu | H01R 13/502 |

* cited by examiner

ELECTRICAL CONNECTOR FOR USE IN CHRISTMAS TREE

CROSS REFERENCE OF RELATED APPLICATION

This is a non-provisional application that claims priority to Chinese application number 202222509753.8, filing date Sep. 21, 2022, the entire contents of each of which are expressly incorporated herein by reference.

BACKGROUND OF THE PRESENT INVENTION

Field of Invention

The present invention relates to an electrical connector, and more particularly to an electrical connector for use on a Christmas tree, wherein the electrical connector can be conveniently and rapidly assembled and disassembled in a safe manner.

Description of Related Arts

Artificial Christmas trees have widely been used for celebrating Christmas. People have decorated artificial Christmas trees by using a wide variety of illuminating devices. Those illuminating devices may generate illumination of different colors and patterns. Conventional illuminating devices for Christmas trees, such as artificial Christmas tree may comprise a plurality of illuminators connected by flexible cables. The flexible cables may be attached on different branches of the Christmas tree so as to allow the entire Christmas tree to have an illuminating effect.

As to the electrical connections of these illuminating devices, there exist broadly two types of connecting assembling. The first type of connecting assemblies usually comprises a first connector and a second connector detachably connected to each other. Each of the first connector and the second connector may be connected to a certain number of illuminators and is usually attached to the Christmas tree and exposed to ambient environment. The disadvantage of this type of connecting assemblies is that a user may accidentally come into contact with the electrical terminals provided on the first connector and the second connector and this poses electrical hazard to users who are decorating the Christmas tree or even to children who accidentally detach the first and the second connector due to curiosity.

The second type of connecting assemblies usually comprises a socket body having both a positive terminal and a negative terminal. The problem with this type of connecting assemblies is that it poses a substantial risk of electrical hazards. For example, of small metallic objects, such as small screw, are accidentally disposed in the socket body and come into contact with both the positive terminal and the negative terminal, short circuit may occur, and this may in turn cause fire from the socket body.

As a result, there is a need to develop an electrical connector which is safe and convenient for use in Christmas trees, such as artificial Christmas trees.

SUMMARY OF THE PRESENT INVENTION

An objective of the present invention is to provide an electrical connector for use on a Christmas tree, wherein the electrical connector can be conveniently and rapidly assembled and disassembled in a safe manner.

In one aspect of the present invention, it provides an electrical connector for a Christmas tree having a hollow tube structure, comprising:

a first electrical connector body having a first receiving cavity and an end plate to form a substantially tubular structure, and comprising:

an outer securing ring;

an inner securing ring provided within the outer securing ring, the outer securing ring and the inner securing ring being concentrically formed in the first receiving cavity;

an annular negative terminal which is mounted in the first receiving cavity, and has an outer diameter corresponding to an inner diameter of the outer securing ring, so that the annular negative terminal is to be received in a space between the inner securing ring and the outer securing ring and is fittedly engaged thereon;

an annular positive terminal which is mounted in the first receiving cavity, and has an outer diameter corresponding to an inner diameter of the inner securing ring, so that the annular positive terminal is to be received in a space surrounded by the inner securing ring and is fittedly engaged thereon;

a negative terminal adapter and a live terminal adapter both provided on an outer side of the end plate, wherein the annular negative terminal and the annular positive terminal are electrically connected to the negative terminal adapter and the live terminal adapter respectively through penetrating the end plate;

a second connector detachably connected to the first connector at the first opening thereof, the second electrical connector body comprising:

a connecting base;

a multiple ring member extending from the connecting base toward the first electrical connector body, the multiple ring member comprising an inner annular member, an outer annular member and a middle annular member positioned between the inner annular member and the outer annular member;

a negative terminal supported by the second electrical connector body and extends to be secured on the outer annular member, the negative terminal being arranged to electrically connect to the annular negative terminal when first electrical connector body is detachably connected to the second electrical connector body; and a positive terminal supported by the second electrical connector body and extends to be secured on the inner annular member, the positive terminal being arranged to electrically connect to the annular positive terminal when first electrical connector body is detachably connected to the second electrical connector body;

a first outer connector connected to the first connector at a position opposite to the second connector; and a second outer connector connected to the second connector at a position opposite to the first connector.

This summary presented above is provided merely to introduce certain concepts and not to identify any key or essential features of the claimed subject matter.

DETAILED DESCRIPTION OF THE PREFERRED EMBODIMENT

Figure 1:
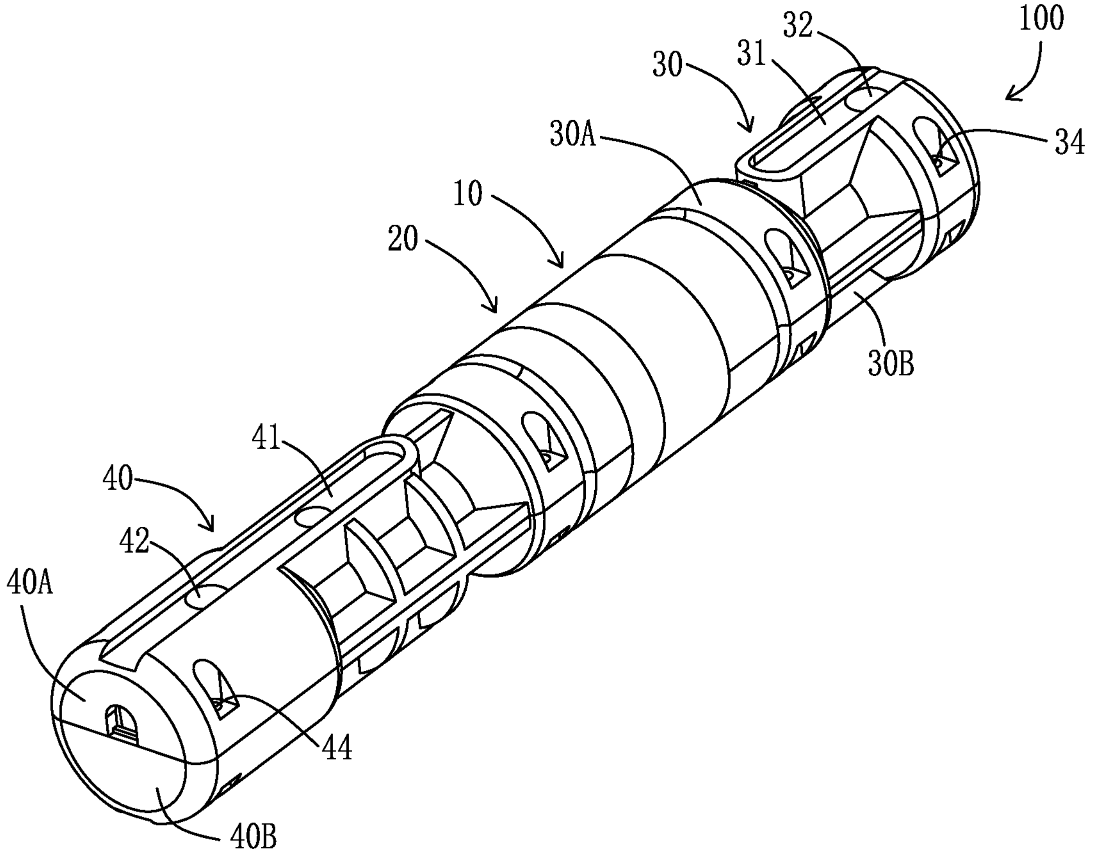
FIG. 1 is a perspective view of an electrical connector according to a preferred embodiment of the present invention.

The following detailed description of the preferred embodiment is the preferred mode of carrying out the invention. The description is not to be taken in any limiting sense. It is presented for the purpose of illustrating the general principles of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Furthermore, "connected" may also mean direct connection or indirect connection, or connection through other auxiliary components. Therefore, the above terms should not be an actual connection limitation of the elements of the present invention.

It should be appreciated that the terms "length", "width", "top", "bottom", "front", "rear", "left", "right", vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIG. 1 to FIG. 7 of the drawings, an electrical connector 100 for use on a Christmas tree according to preferred embodiment of the present invention is illustrated. Broadly, the electrical connector comprises a first electrical connector body 10, a second electrical connector body 20, a first outer connector 30, and a second outer connector 40.

The first electrical connector body 10, the second electrical connector body 20, the first outer connector 30, and the second outer connector 40 are coaxially arranged to form an elongated structure. The first electrical connector body 10 is detachably connected to the second electrical connector body 20. The first outer connector 30 is detachably connected to the first electrical connector body 10 at a position opposite to the second electrical connector body 20. Similarly, the second outer connector 40 is detachably connected to the second electrical connector body 20 at a position opposite to the first electrical connector body 10.

Thus, as shown in FIG. 1 of the drawings, the first outer connector 30, the first electrical connector body 10, the second electrical connector body 20 and the second outer connector 40 are sequentially arranged along a longitudinal axis of the electrical connector 100 of the present invention. The electrical connector 100 may be installed and received within a hollow cavity of a tubular structure of a Christmas tree, such as a branch of an artificial Christmas tree. More specifically, the first outer connector 30 and the second outer connector 40 may be accessible from two ends of the corresponding tubular structure of the artificial Christmas tree.

The first electrical connector body 10 may be configured from electrical insulating material, such as plastic material, and may have a tubular structure having a receiving cavity 102 formed therein. According to the preferred embodiment of the present invention, the first electrical connector body 10 further have a first opening 103 and an end plate 101 formed on two ends thereof respectively, wherein are receiving cavity 102 is formed in a space between the first opening 102 and the end plate 101. Moreover, the first electrical connector body 10 further has a first connecting rim 17, in which the first outer connector 30 is detachably connected to the first electrical connector body 10 through the first connecting rim 17.

Figure 4:
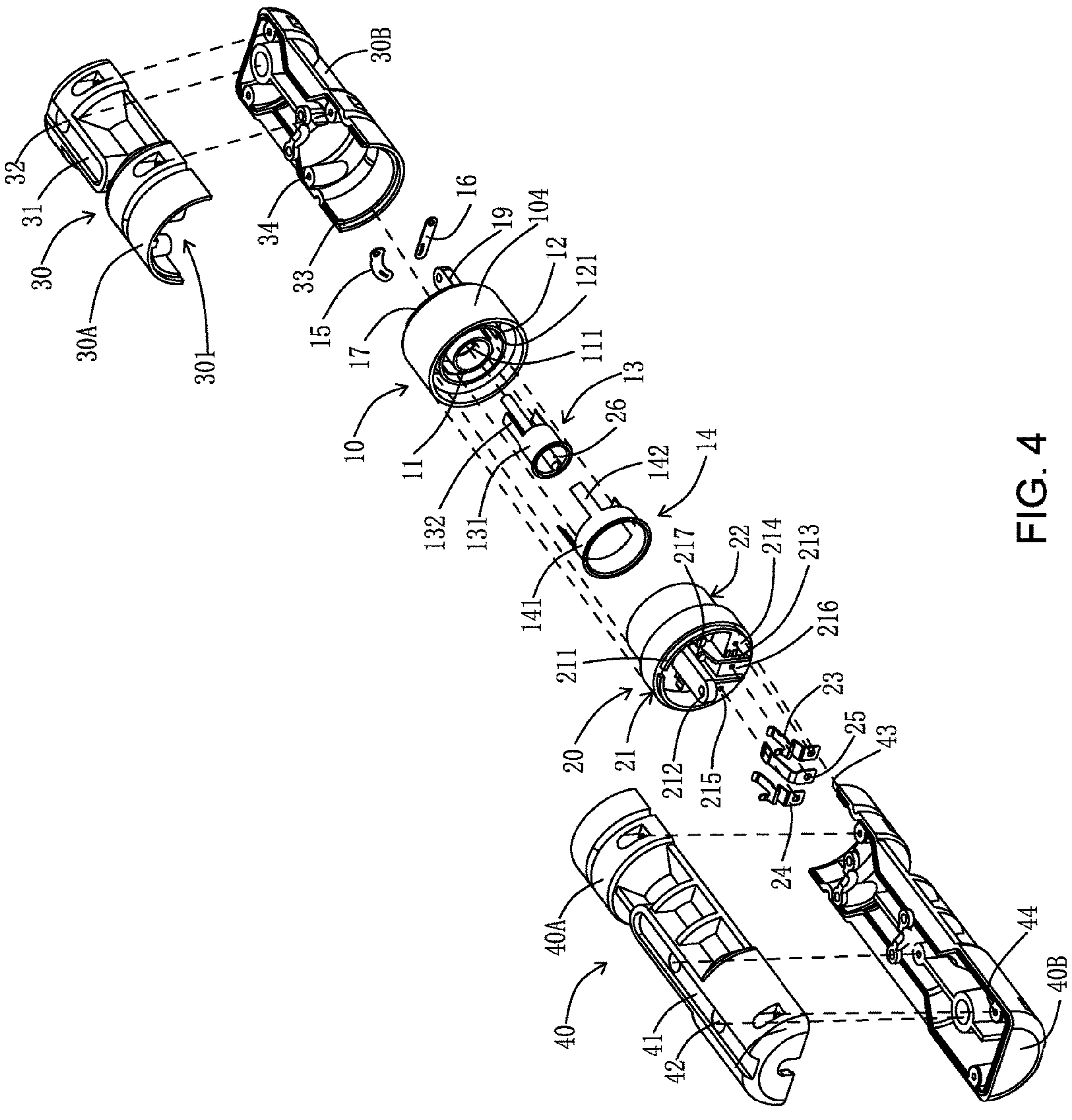
FIG. 4 is an exploded perspective view of the electrical connector according to the preferred embodiment of the present invention.
Figure 7:
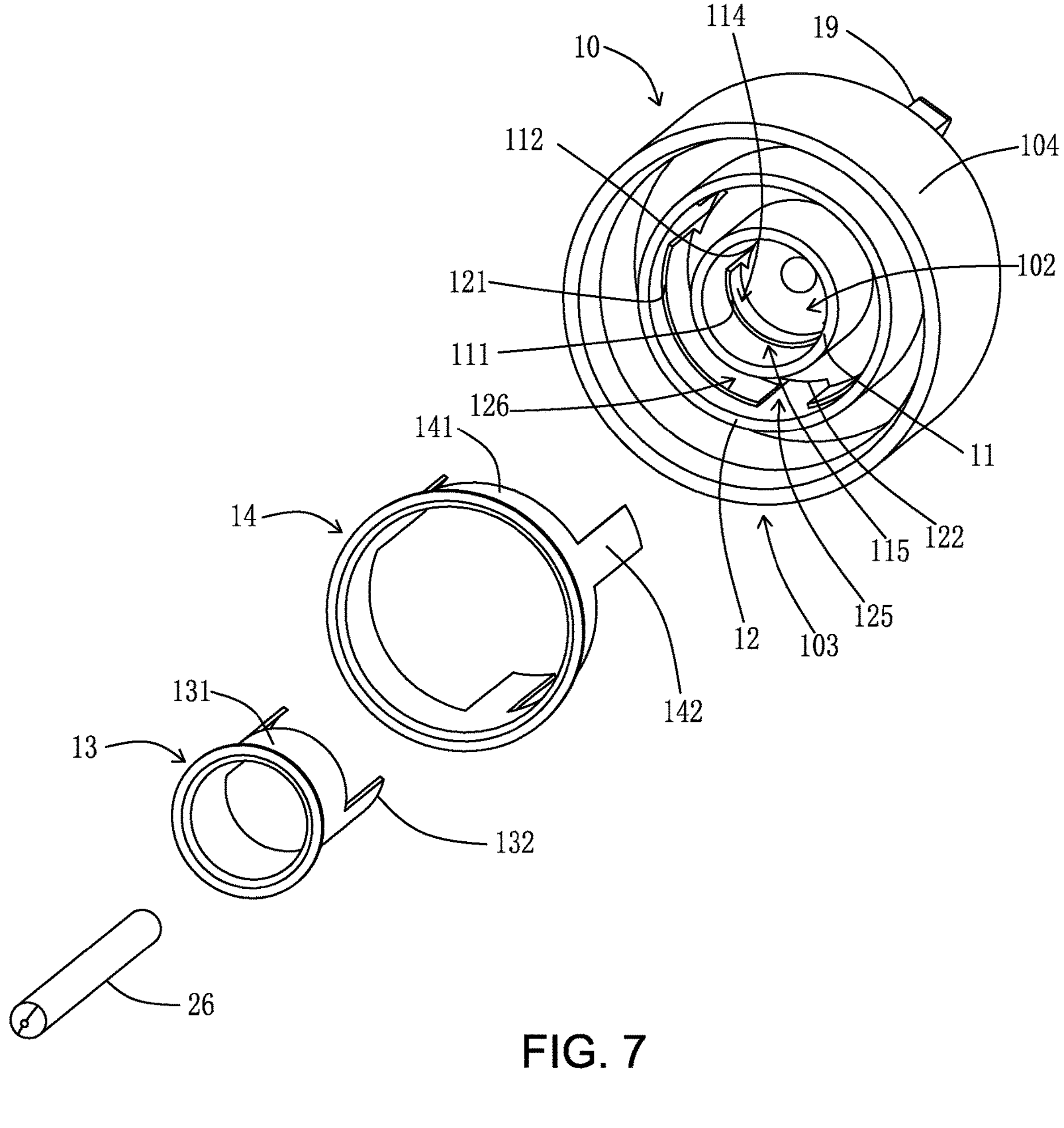
FIG. 7 is a perspective view of a first electrical connector body of the electrical connector according to the preferred embodiment of the present invention.

As shown in FIG. 4 of the drawings, the first electrical connector body 10 further comprise an inner securing ring 11 and an outer securing ring 12 spacedly formed in the receiving cavity 102. According to the preferred embodiment of the present invention, each of the inner securing ring 11 and the outer securing ring 12 is configured to be tubular in structure (i.e. having circular cross section when viewed from longitudinal direction of the first electrical connector body). Thus, as shown in FIG. 7 of the drawings, an outer wall 104 of the first electrical connector body 10, the outer securing ring 12 and the inner securing ring 11 are concentrically and spacedly arranged in the receiving cavity 102.

The first electrical connector body 10 further comprises an annular negative terminal 14 and an annular positive terminal 13. An outer diameter of the annular positive terminal 13 is corresponding to an inner diameter of the inner securing ring 11, so that the annular positive terminal 13 can be received in the space surrounded by the inner securing ring 11 and is fittedly engaged thereon.

On the other hand, the outer diameter of the annular negative terminal 14 is corresponding to an inner diameter of the outer securing ring 12, so that the annular negative terminal 14 can be received in the space between the inner securing ring 11 and the outer securing ring 12 and is fittedly engaged thereon.

Figure 5:
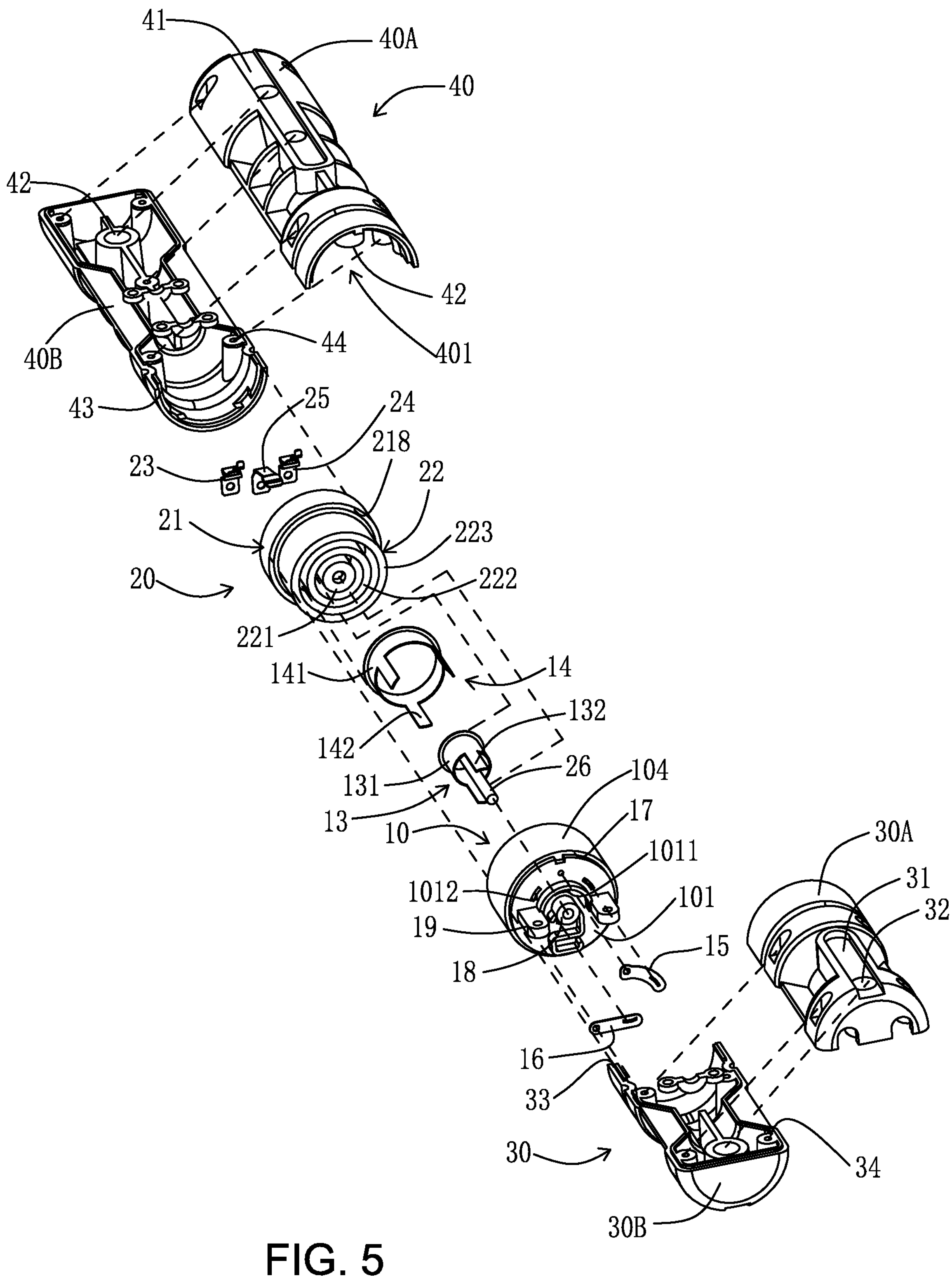
FIG. 5 is another exploded perspective view of the electrical connector according to the preferred embodiment of the present invention.

As shown in FIG. 5 of the drawings, the first electrical connector body 10 further comprises a negative terminal adapter 15 and a live terminal adapter 16 provided on an outer side of the end plate 101, wherein the annular negative terminal 14 and the annular positive terminal 13 are electrically connected to the negative terminal adapter 15 and the live terminal adapter 16 respectively through penetrating the end plate 101.

As shown in FIG. 5 and FIG. 7 of the drawings, the annular positive terminal 13 comprises a annular positive terminal body 131 and a plurality of live terminal legs 132 extending from the annular positive terminal body 131 in a direction towards the end plate 101. Similarly, the annular negative terminal 14 comprises an annular negative terminal body 141 and a plurality of negative terminal legs 142 extending from the annular negative terminal body 141 in a direction towards the end plate 101.

The end plate 101 further has a plurality of through first elongated slots 1011 and a plurality of through second elongated slots 1012. The first elongated slots 1011 are positioned corresponding to the negative terminal legs 142 respectively so that the negative terminal legs 142 are allowed to penetrate the end plate 101 through the first elongated slots 1011 so as to electrically connect to the negative terminal adapter 15. Similarly, the second elongated slots 1012 are positioned corresponding to the live terminal legs 132 respectively so that the live terminal legs 132 are allowed to penetrate the end plate 101 through the second elongated slots 1012 so as to electrical connect to the live terminal adapter 16.

Moreover, the end plate 101 further has a first connecting tube 18 and a plurality of first connecting flanges 19 extending from the end plate 101 in a direction toward the first outer connector 30. The first connecting tube 18 is arranged to allow electrical wires to pass from the first electrical connector body 10 to the second electrical connector body 20. The first connecting flange 19 are adapted for mounting to the second electrical connector body 20 (described below).

As shown in FIG. 7 of the drawings, the inner securing ring 11 has a first longitudinal portion 115 and a first contracted portion 114 having smaller internal diameter than that of the first longitudinal portion 115 to form a first securing ridge 111 between the first longitudinal portion 115 and the first contracted portion 114 for securing the position of the annular positive terminal 13. Moreover, the inner securing ring 11 further has a plurality of first guiding slots 112 longitudinally formed on an inner surface of the inner securing ring 11 at the first contracted portion 114, wherein the first guiding slots 112 are arranged to communicate with the first elongated slots 1011 of the end plate 101 respectively.

In this preferred embodiment of the present invention, the annular positive terminal 13 is arranged to be secured on the inner securing ring 11 in such a manner that the annular positive terminal body 131 is secured on the first longitudinal portion 115 of the inner securing ring 11 while the live terminal legs 132 extend toward the first contracted portion 114 and pass through the first guiding slots 112 respectively. The position of the annular positive terminal body 131 is secured or limited by the first securing ridge 111 of the inner securing ring 11. The live terminal legs 132 is arranged to extend through the first guiding slots 112 and penetrate the first elongated slots 1011 respectively and electrically connect to the live terminal adapter 16. The live terminal adapter 16 may be mounted on the outer side of the end plate 101 by conventional mechanisms.

Similarly, the outer securing ring 12 has a second longitudinal portion 125 and a second contracted portion 124 having smaller internal diameter than that of the second longitudinal portion 125 to form a second securing ridge 121 between the first longitudinal portion 115 and the first contracted portion 114 for securing the position of the annular positive terminal 13. Moreover, the outer securing ring 12 further has a plurality of second guiding slots 122 longitudinally formed on an inner surface of the outer securing ring 12 at the second contracted portion 124, wherein the second guiding slots 122 are arranged to communicate with the second elongated slots 1012 of the end plate 101 respectively.

The annular negative terminal 14 is arranged to be secured on the outer securing ring 12 in such a manner that the negative terminal ring body 141 is secured on the second longitudinal portion 125 of the outer securing ring 12 while the negative terminal legs 142 extend toward the second contracted portion 124 and pass through the second guiding slots 122 respectively. The position of the negative terminal ring body 141 is secured or limited by the second securing ridge 121 of the outer securing ring 12. The negative terminal legs 142 is arranged to extend through the second guiding slots 122 and penetrate the second elongated slots 1012 respectively and electrically connect to the negative terminal adapter 15. The negative terminal adapter 15 may be mounted on the outer side of the end plate 101 by conventional mechanisms.

Figure 6:
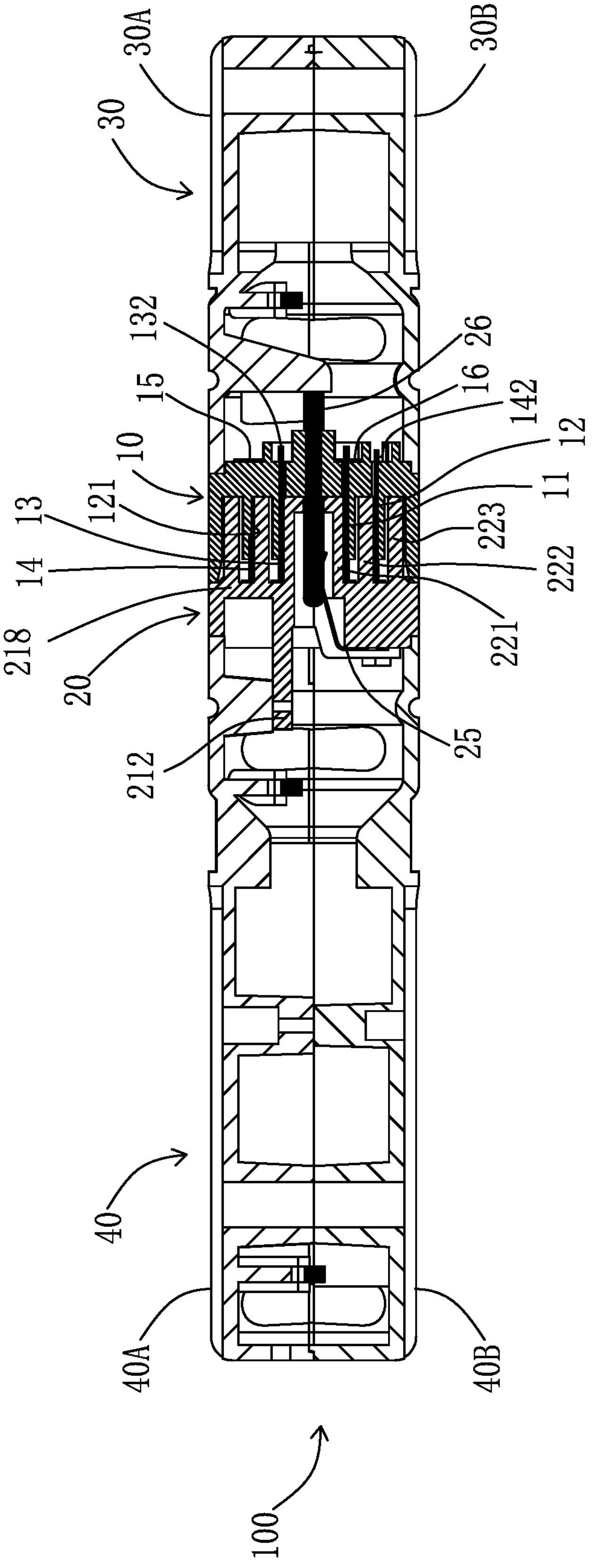
FIG. 6 is a sectional side view of the electrical connector according to the preferred embodiment of the present invention.

Referring to FIG. 4 to FIG. 6 of the drawings, the second electrical connector body 20 is detachably attached to the first electrical connector body 10 at the first opening 102 thereof. The second electrical connector body 20 comprises a connecting base 21 and a multiple ring member 22 extending from the connecting base 21 toward the first electrical connector body 10. Each of the connecting portion 21 and the multiple ring member 22 has a substantially tubular structure. Furthermore, the connecting base 21 and the multiple ring member 22 may also form an integral structure. The second electrical connector body 20 further has a base wall 218 extending between the connecting base 21 and the multiple ring member 22.

The multiple ring member 22 of the second electrical connector body 20 comprises an inner annular member 221, an outer annular member 223 and a middle annular member 222 positioned between the inner annular member 221 and the outer annular member 223. Each of the inner annular member 221, the middle annular member 222, and the outer annular member 223 has a tubular structure and has a circular cross sectional shape when viewed from the longitudinal direction of the first electrical connector body 10. Moreover, a diameter of the outer annular member 223 is larger than that of the middle annular member 222, but smaller than a diameter of the connecting base 21. A diameter of the middle annular member 222 is larger than that of the inner annular member 221. The connecting base 21, the outer annular member 223, the middle annular member 222 and the inner annular member 221 are concentrically arranged and extend toward the first electrical connector body 10. These structures are illustrated in FIG. 5 of the drawings. The second electrical connector body 20 may also be configured from electrical insulating material, such as plastic material.

The second electrical connector body 20 further comprises a negative terminal holder 214, a live terminal holder 215, a neutral wire holder 216, a second connecting tube 217, a negative terminal 23 secured on the negative terminal holder 214, a live terminal 24 secured on the live terminal holder 215, and a neutral terminal 25 secured on the neutral wire holder 216. In order to ensure maximum safety of the present invention, the negative terminal 23, the live terminal 24 and the neutral terminal 25 are physically separated by an insulating wall 213.

The second electrical connector body 20 further comprises a second connecting flange 212 extending from the connecting base 21 to connect to the second outer connector 40. As shown in FIG. 4 to FIG. 5 of the drawings, the negative terminal 23, the live terminal 24, and the neutral terminal 25 are arranged to penetrate through the base wall 218 of the second electrical connector body 20 to reach the multiple ring member 22. More specifically, the negative terminal 23 is electrically connected to the annular negative terminal 14, while the live terminal 24 is electrically connected to the annular positive terminal 13.

Referring to FIG. 5 to FIG. 6 of the drawings, the second electrical connector body 20 further comprises a neutral conductive member 26 arranged to penetrate through the second electrical connector body 20 and the first electrical connector body 10, wherein the neutral terminal 25 extends to pass through the second connecting tube 217 and connect to one end of the neutral conductive member 26. The neutral conductive member 26 is arranged to extend through the second connecting tube 217 and the first connecting tube 18 so that the other end of the neutral conductive member 26 is arranged to connect to a power supply.

Figure 2:
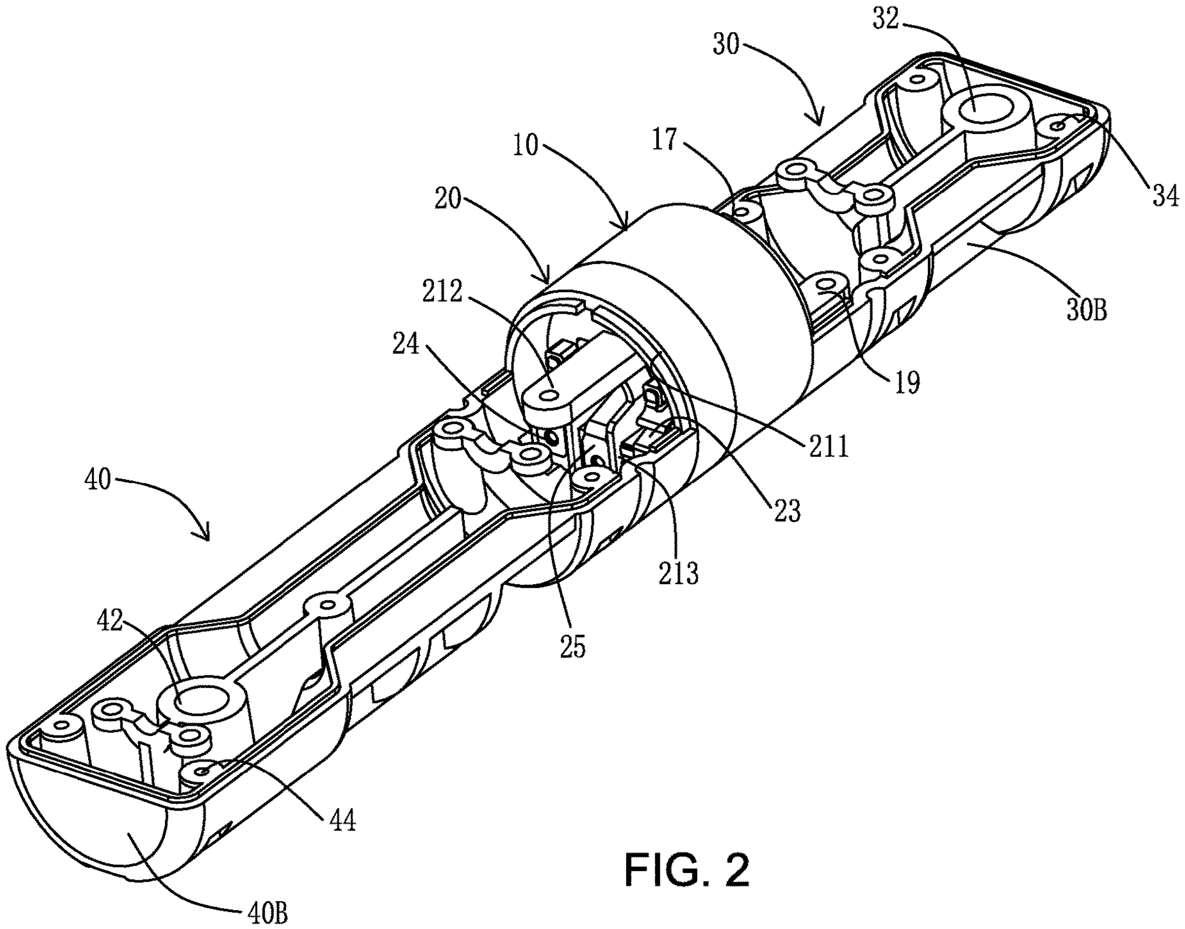
FIG. 2 is a schematic diagram of the electrical connector according to the preferred embodiment of the present invention, illustrating the internal structure of a first outer connector and a second outer connector.
Figure 3:
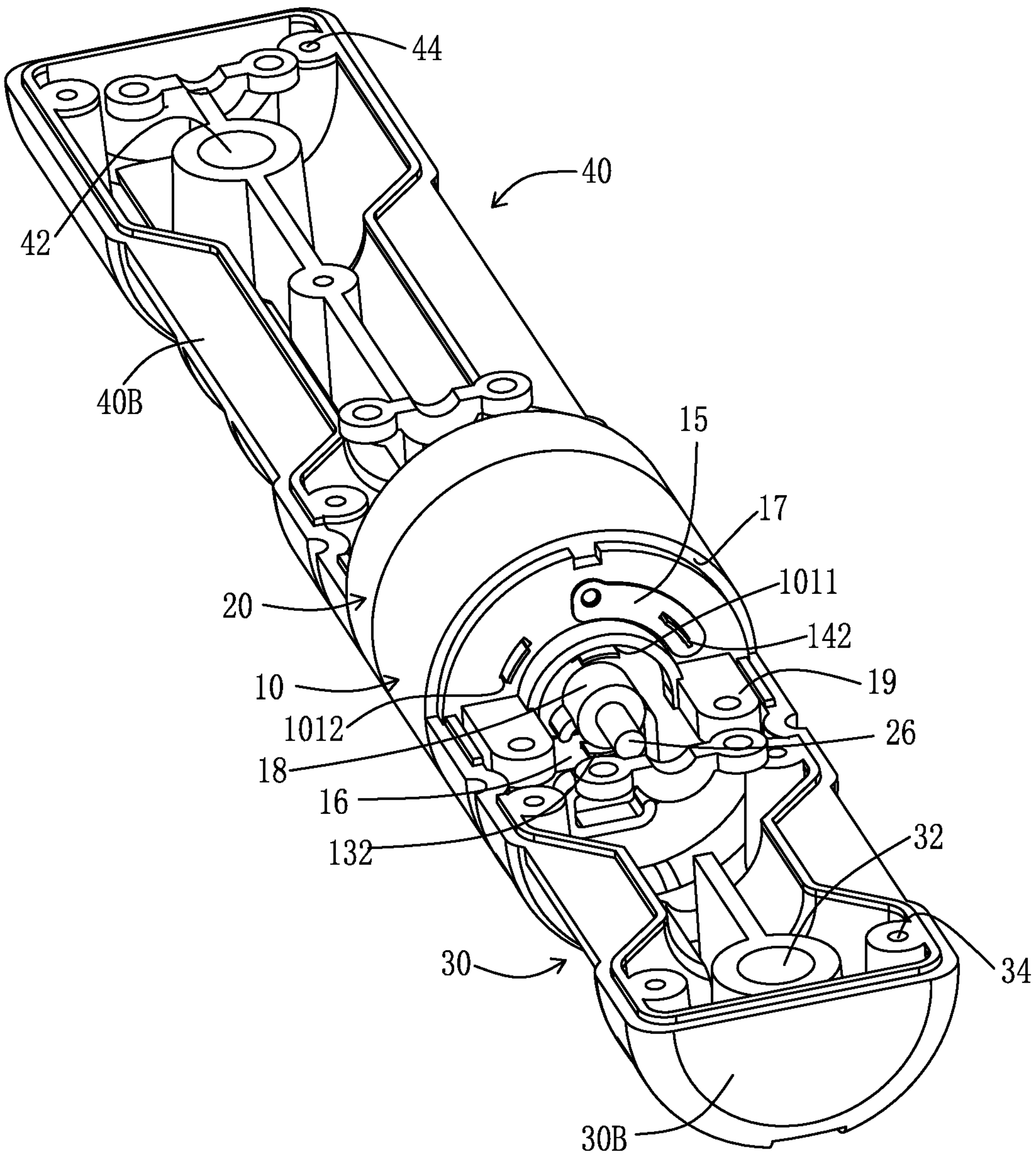
FIG. 3 is another schematic diagram of the electrical connector according to the preferred embodiment of the present invention, illustrating the internal structure of the first outer connector and the second outer connector.

Referring to FIG. 2 to FIG. 3 of the drawings, the connecting portion 21 of the second electrical connector body 20 further has a second connecting rim 211, wherein the connecting portion 21 is arranged to connect to the second outer connector 40 through the second connecting rim 211. On the other hand, the multiple ring member 22 is detachably connected to the inner securing ring 11 and the outer securing ring 12 so as to detachably connect the second electrical connector body 20 to the first electrical connector body 10.

Referring to FIG. 1 to FIG. 7 of the drawings, the first outer connector 30 is configured from electrically insulated material, such as plastic material. The first outer connector 30 is configured to have a tubular structure, in which one end of the first outer connector 30 is connected to the first electrical connector body 20, while the other end may be mounted on the artificial Christmas tree.

According to the preferred embodiment of the present invention, the first outer connector 30 may be configured to have a substantially tubular structure corresponding to that of the first electrical connector body 10. The first outer connector 30 has a first tubular body 30A and a second tubular body 30B. The first tubular body 30A and the second tubular body 30B are connected to form the substantially tubular structure of the first outer connector 30. The connection between the first tubular body 30A and the second tubular body 30B may be accomplished through screws and a first threaded hole 34 provided on the second tubular body 30B. The first outer connector 30 is arranged to be detachably mounted on the artificial Christmas tree through a first mounting slot 31 and a first mounting hole 32. The first outer connector 30 is connected to the first electrical connector body 10 through mounting on the first connecting flanges 19. As shown in FIG. 4 of the drawings, the first outer connector 30 has a first protective opening 301 and a third connecting rim 33 formed around the first protective opening 301, wherein the third connecting rim 33 is arranged to engage with the first connecting rim 17 when the first outer connector 30 is connected to the first electrical connector body 10.

Referring to FIG. 1 to FIG. 7 of the drawings, the second outer connector 40 may also be configured to have a substantially tubular structure corresponding to that of the second electrical connector body 20. The second outer connector 40 has a third tubular body 40A and a fourth tubular body 40B. The third tubular body 40A and the fourth tubular body 40B are connected to form the substantially tubular structure of the second outer connector 40. The connection between the third tubular body 40A and the fourth tubular body 40B may be accomplished through screws and a second threaded hole 44 provided on the fourth tubular body 40B. The second outer connector 40 is arranged to be detachably mounted on the artificial Christmas tree through a second mounting slot 41 and a second mounting hole 42. The first outer connector 30 is connected to the first electrical connector body 10 through mounting on the first connecting flanges 19. The second outer connector 40 has a second protective opening 401 and a fourth connecting rim 43 formed around the second protective opening 401, wherein the fourth connecting rim 43 is arranged to engage with the second connecting rim 211 when the second outer connector 40 is connected to the second electrical connector body 20. Moreover, the second outer connector 40 may be connected to the second electrical connector body 20 through connecting to the second connecting flange 212 of the second electrical connector body.

Referring to FIG. 1 and FIG. 5 of the drawings, the first protective cover 30 further has a first wiring hole while the second protective cover 40 further has a second wiring hole, wherein power supply wires are arranged to be inserted into the first protective cover 30 and the second protective cover 40 through the first wiring hole and the second wiring hole. The power supply wires are electrically connected to the negative terminal adapter 15, the live terminal adapter 16 of the first electrical connector body 10, and the neutral conductive member 26 of the second electrical connector body 20.

The operation of the present invention is as follows: a user may first connect the first tubular body 30A to the second tubular body 30B to form an integral first outer connector 30. Similarly, the user may also connect the third tubular body 40A to the fourth tubular body 40B to form an integral second outer connector 40. After that, the first outer connector 30 may be connected to the first electrical connector body 10 through engaging the third connecting rim 33 with the first connecting rim 17. The second outer connector 40 may be connected to the second electrical connector body 20 through engaging the fourth connecting rim 43 with the second connecting rim 211 to form the electrical connector 100 of the present invention.

The electrical connector 100 of the present invention may be mounted in a tubular structure (such as a branch) of an artificial Christmas tree for supplying power to the relevant lighting devices. When some electrical components are out of order, a user may conveniently detach the relevant electrical connector 100 from the artificial Christmas tree and perform the necessary repair. After that the electrical connector 100 may be mounted back to the artificial Christmas tree.

Figure 8:
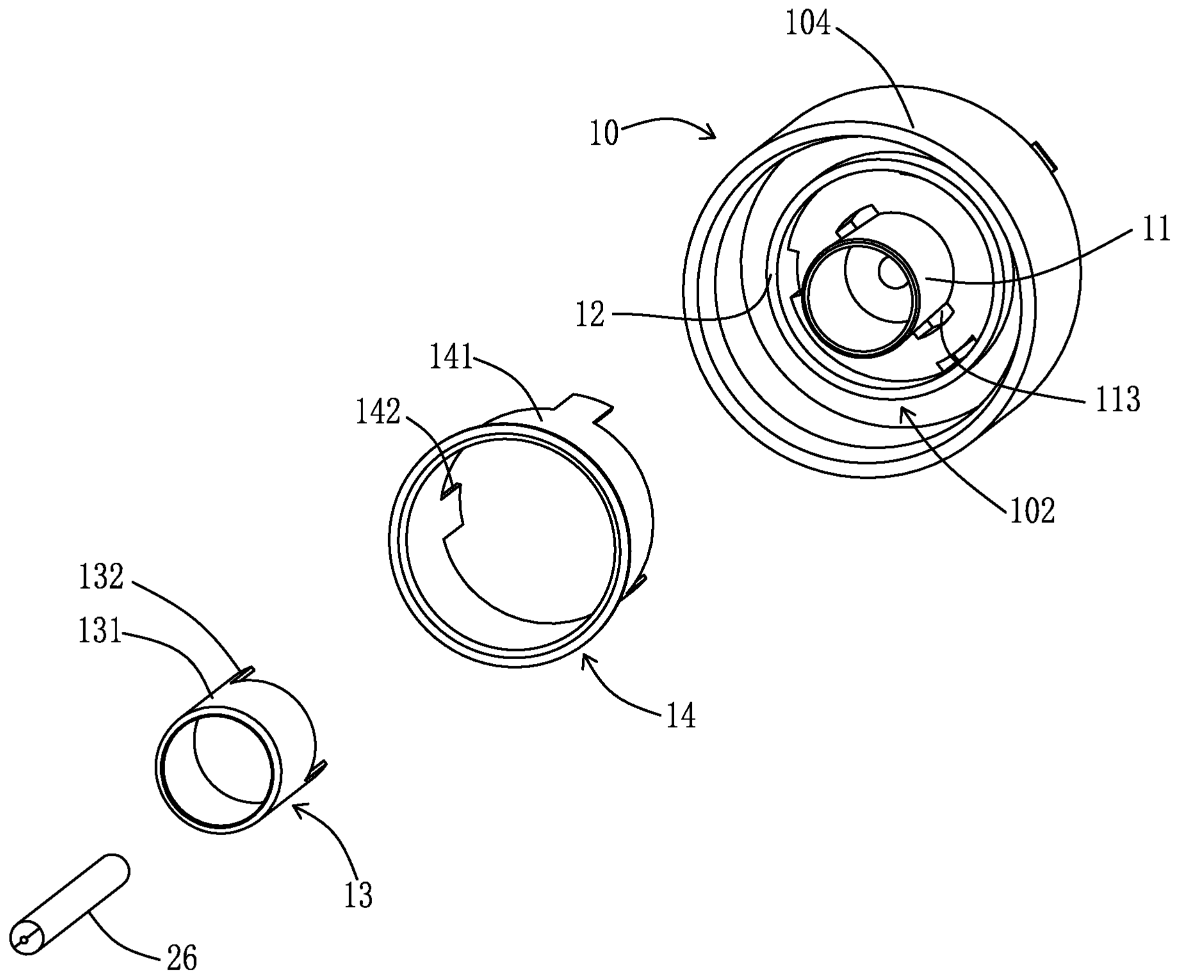
FIG. 8 is an alternative mode of the electrical connector according to the preferred embodiment of the present invention.

Referring to FIG. 8 of the drawings, an alternative mode of the of the electrical connector according to the preferred embodiment of the present invention is illustrated. The difference between the alternative mode and the preferred embodiment described above is that the inner securing ring 11 of the first electrical connector body 10 has a uniform diameter throughout a longitudinal direction. Moreover, the first electrical connector body 10 further comprise a plurality of securing protrusions 113 outwardly extending from an outer surface of the inner securing ring 11, wherein the annular positive terminal 13 is arranged to be secured on the outer surface of the inner securing ring 11, in such a manner that the live terminal legs 132 are secured to the securing protrusions 113 and penetrate through the end plate 101 to connect to the live terminal adapter 16 mounted on an outer side of the end plate 101.

In this alternative mode of the preferred embodiment, the outer securing ring 12 also has a uniform diameter throughout a longitudinal direction, wherein the annular negative terminal 14 is secured on an inner surface of the outer securing ring 12, in such a manner that the annular negative terminal body 141 is secured to bias against the end plate 101, while the negative terminal legs 142 are arranged to penetrate through the end plate 101 to electrically connect to the negative terminal adapter 15 mounted on an outer side of the end plate 101.

As shown in FIG. 8 of the drawings, the first electrical connector body 10 effectively separates the annular positive terminal 13 and the annular negative terminal 14 by the construction of the inner securing ring 11 and the outer securing ring 12 so as to effectively prevent the annular positive terminal 13 from accidentally contacting the annular negative terminal 14. As such, the electrical hazard of the present invention can be substantially minimized.

The present invention, while illustrated and described in terms of a preferred embodiment and several alternatives, is not limited to the particular description contained in this specification. Additional alternative or equivalent components could also be used to practice the present invention.

What is claimed is:

1. An electrical connector for a Christmas tree having a hollow tube structure, comprising:

a first electrical connector body having a first receiving cavity and an end plate to form a substantially tubular structure, and comprising:

an outer securing ring;

an inner securing ring provided within said outer securing ring, said outer securing ring and said inner securing ring being concentrically formed in said first receiving cavity;

a annular negative terminal which is mounted in said first receiving cavity, and has an outer diameter corresponding to an inner diameter of said outer securing ring, so that said annular negative terminal is to be received in a space between said inner securing ring and said outer securing ring and is fittedly engaged thereon;

a annular positive terminal which is mounted in said first receiving cavity, and has an outer diameter corresponding to an inner diameter of said inner securing ring, so that said annular positive terminal is to be received in a space surrounded by said inner securing ring and is fittedly engaged thereon;

a negative terminal adapter and a live terminal adapter both provided on an outer side of said end plate, wherein said annular negative terminal and said annular positive terminal are electrically connected to said negative terminal adapter and said live terminal adapter respectively through penetrating said end plate;

a second connector detachably connected to said first connector at said first opening thereof, said second electrical connector body comprising:

a connecting base;

a multiple ring member extending from said connecting base toward said first electrical connector body, said multiple ring member comprising an inner annular member, an outer annular member and a middle annular member positioned between said inner annular member and said outer annular member;

a negative terminal supported by said second electrical connector body and extends to be secured on said outer annular member, said negative terminal being arranged to electrically connect to said annular negative terminal when first electrical connector body is detachably connected to said second electrical connector body; and a positive terminal supported by said second electrical connector body and extends to be secured on said inner annular member, said positive terminal being arranged to electrically connect to said annular positive terminal when first electrical connector body is detachably connected to said second electrical connector body;

a first outer connector connected to said first connector at a position opposite to said second connector; and a second outer connector connected to said second connector at a position opposite to said first connector.

2. The electrical connector, as recited in claim 1, wherein said annular positive terminal comprises a annular positive terminal body and a plurality of live terminal legs extending from said annular positive terminal body in a direction towards said end plate.

3. The electrical connector, as recited in claim 2, wherein said annular negative terminal comprises a annular negative terminal body and a plurality of negative terminal legs extending from said annular negative terminal body in a direction towards said end plate.

4. The electrical connector, as recited in claim 3, wherein said inner securing ring has a first longitudinal portion and a first contracted portion having a smaller internal diameter than that of said first longitudinal portion to form a first securing ridge between said first longitudinal portion and said first contracted portion, said inner securing ring further having a plurality of first guiding slots longitudinally formed on an inner surface of said inner securing ring at said first contracted portion, wherein said first guiding slots are arranged to communicate with said first elongated slots of said end plate respectively, said annular positive terminal being arranged to be secured on said inner securing ring in such a manner that said annular positive terminal body is secured on said first longitudinal portion of said inner securing ring while said live terminal legs extend toward said first contracted portion and pass through said first guiding slots respectively, a position of said annular positive terminal body is limited by said first securing ridge of said inner securing ring.

5. The electrical connector, as recited in claim 4, wherein said outer securing ring has a second longitudinal portion and a second contracted portion having a smaller internal diameter than that of said second longitudinal portion to form a second securing ridge between said first longitudinal portion and said first contracted portion, said outer securing ring further having a plurality of second guiding slots longitudinally formed on an inner surface of said outer securing ring at said second contracted portion, wherein said second guiding slots are arranged to communicate with said second elongated slots of said end plate respectively, said annular negative terminal being arranged to be secured on said outer securing ring in such a manner that said annular negative terminal body is secured on said second longitudinal portion of said outer securing ring while said negative terminal legs extend toward said second contracted portion and pass through said second guiding slots respectively, a position of said annular negative terminal body is limited by said second securing ridge of said outer securing ring.

6. The electrical connector, as recited in claim 3, wherein said inner securing ring of said first electrical connector body has a uniform diameter throughout a longitudinal direction, said first electrical connector body further comprising a plurality of securing protrusions outwardly extending from an outer surface of said inner securing ring, wherein said annular positive terminal is arranged to be secured on said outer surface of said inner securing ring, in such a manner that said live terminal legs are secured to said securing protrusions and penetrate through said end plate to connect to said live terminal adapter mounted on an outer side of said end plate.

7. The electrical connector, as recited in claim 6, wherein said outer securing ring has a uniform diameter throughout a longitudinal direction, wherein said annular negative terminal is secured on an inner surface of said outer securing ring, in such a manner that said annular negative terminal body is secured to bias against said end plate, while said negative terminal legs are arranged to penetrate through said end plate to electrically connect to said negative terminal adapter mounted on an outer side of said end plate.

8. The electrical connector, as recited in claim 5, wherein a diameter of said outer annular member is larger than that of said middle annular member, but smaller than a diameter of said connecting base, a diameter of said middle annular member being larger than that of said inner annular member, said connecting base, said outer annular member, said middle annular member and said inner annular member concentrically extending toward said first electrical connector body.

9. The electrical connector, as recited in claim 7, wherein a diameter of said outer annular member is larger than that of said middle annular member, but smaller than a diameter of said connecting base, a diameter of said middle annular member being larger than that of said inner annular member, said connecting base, said outer annular member, said middle annular member and said inner annular member concentrically extending toward said first electrical connector body.

10. The electrical connector, as recited in claim 8, wherein said second electrical connector body further comprises a negative terminal holder, a live terminal holder, a neutral wire holder, a second connecting tube, a negative terminal secured on said negative terminal holder, a live terminal secured on said live terminal holder, a neutral terminal secured on said neutral wire holder, and at least one insulating wall separating said negative terminal, said live terminal and said neutral terminal.

11. The electrical connector, as recited in claim 9, wherein said second electrical connector body further comprises a negative terminal holder, a live terminal holder, a neutral wire holder, a second connecting tube, a negative terminal secured on said negative terminal holder, a live terminal secured on said live terminal holder, a neutral terminal secured on said neutral wire holder, and at least one insulating wall separating said negative terminal, said live terminal and said neutral terminal.

12. The electrical connector, as recited in claim 10, wherein said first outer connector has a first tubular body and a second tubular body connected to said first tubular body to forma substantially tubular structure of said first outer connector, said first electrical connector body further comprising a first connecting flange, wherein said first outer connector is connected to said first electrical connector body through mounting on said first connecting flange.

13. The electrical connector, as recited in claim 11, wherein said first outer connector has a first tubular body and a second tubular body connected to said first tubular body to form a substantially tubular structure of said first outer connector, said first electrical connector body further comprising a first connecting flange, wherein said first outer connector is connected to said first electrical connector body through mounting on said first connecting flange.

14. The electrical connector, as recited in claim 12, wherein said second outer connector comprises a third tubular body and a fourth tubular body connected to said third tubular body to form a substantially tubular structure of said second outer connector, said second electrical connector body further comprising a second connecting flange, wherein said second outer connector is connected to said second electrical connector body through mounting on said second connecting flange.

15. The electrical connector, as recited in claim 13, wherein said second outer connector comprises a third tubular body and a fourth tubular body connected to said third tubular body to form a substantially tubular structure of said second outer connector, said second electrical connector body further comprising a second connecting flange, wherein said second outer connector is connected to said second electrical connector body through mounting on said second connecting flange.

* * * * *